(12) United States Patent
Desai et al.

(10) Patent No.: US 9,086,757 B1
(45) Date of Patent: Jul. 21, 2015

(54) METHODS AND SYSTEMS FOR PROVIDING FUNCTIONALITY OF AN INTERFACE TO CONTROL DIRECTIONAL ORIENTATIONS OF A DEVICE

(75) Inventors: Munjal Desai, Mountain View, CA (US); Ryan Hickman, Mountain View, CA (US); Thor Lewis, Mountain View, CA (US); Damon Kohler, Mountain View, CA (US)

(73) Assignee: Google Inc., Mountain View, CA (US)

( * ) Notice: Subject to any disclaimer, the term of this patent is extended or adjusted under 35 U.S.C. 154(b) by 609 days.

(21) Appl. No.: 13/213,717

(22) Filed: Aug. 19, 2011

(51) Int. Cl.
*G06F 3/041* (2006.01)
*G06F 3/048* (2013.01)
*B25J 13/06* (2006.01)

(52) U.S. Cl.
CPC .............. *G06F 3/0416* (2013.01); *B25J 13/06* (2013.01); *G06F 3/048* (2013.01)

(58) Field of Classification Search
CPC .............. G05B 19/19; G05B 19/4068; G05B 19/4069; G05B 19/425; G05B 2219/35318; G05B 2219/35487; G05B 2219/35506; G05B 19/36017; G05B 2219/39449; G05B 2219/42171; G05B 2219/43176; G05B 2219/36516; G05B 2219/42175; G05B 2219/43034; G05B 2219/43036; G05B 2219/43074; G05B 2219/43088; G05D 1/0223; G05D 1/0212; G05D 1/0038; G05D 1/0011; B25J 13/06; A63F 2300/308
USPC .............. 700/245–264; 901/1; 715/764, 773, 715/858–859, 700, 701, 702, 716; 345/156–169; 463/30–34, 36–39
See application file for complete search history.

(56) References Cited

U.S. PATENT DOCUMENTS

| | | | | |
|---|---|---|---|---|
| 4,987,527 A * | 1/1991 | Hamada et al. | ................. | 700/64 |
| 6,256,649 B1 * | 7/2001 | Mackinlay et al. | ........... | 715/212 |
| 7,236,854 B2 * | 6/2007 | Pretlove et al. | ............... | 700/246 |
| 2008/0229254 A1 * | 9/2008 | Warner | ........................ | 715/856 |
| 2009/0249257 A1 * | 10/2009 | Bove et al. | ..................... | 715/858 |
| 2010/0082156 A1 * | 4/2010 | Root et al. | ..................... | 700/264 |
| 2010/0106514 A1 * | 4/2010 | Cox | ............................... | 705/1.1 |
| 2011/0063218 A1 * | 3/2011 | Hertenstein | ................... | 345/161 |

OTHER PUBLICATIONS

ASW Systems, Introduction to Naval Weapons Engineering, Basic Sonar System, Mar. 1, 2010, courtesy of Internet Wayback Machine.*

* cited by examiner

*Primary Examiner* — Khoi Tran
*Assistant Examiner* — Abby Lin
(74) *Attorney, Agent, or Firm* — McDonnell Boehnen Hulbert & Berghoff LLP

(57) ABSTRACT

Methods and systems for providing functionality of a user interface to control directional orientations of a device are provided. An example method includes receiving an input on an interface indicating a command for a directional orientation of a robotic device, and providing an indicator on the interface representing a location of the input. The indicator may include a representation of the command for the directional orientation of the robotic device. The method may further include determining that the location of the input on the interface is within a distance threshold to a pre-set location on the interface, and repositioning the indicator on the interface to be at the pre-set location. In this manner, the indicator may snap to a location if the input is close to a pre-set location, for example.

24 Claims, 6 Drawing Sheets

METHODS AND SYSTEMS FOR PROVIDING FUNCTIONALITY OF AN INTERFACE TO CONTROL DIRECTIONAL ORIENTATIONS OF A DEVICE

BACKGROUND

In industrial design, a user interface provides functionality to enable interaction between humans and machines. A goal of interaction between a human and a machine at the user interface is generally effective operation and control of the machine, and feedback from the machine that aids the user in making operational decisions. Examples of user interfaces include interactive aspects of computer operating systems, hand tools, heavy machinery operator controls, and process controls.

Design considerations applicable when creating user interfaces may be related to or involve ergonomics and psychology. For example, user interfaces can be designed so as to be associated with the functionalities of a product, such as to enable intended uses of the product by users with efficiency, effectiveness, and satisfaction, taking into account requirements from context of use.

A user interface includes hardware and software components. User interfaces exist for various systems, and provide a manner to provide inputs allowing users to manipulate a system, and/or receive outputs allowing the system to indicate effects of the users' manipulation. Many types of user interfaces exist. One example user interface includes a graphical user interface (GUI) that is configured to accept inputs via devices such as a computer keyboard and mouse and provide graphical outputs on a display. Another example user interface includes touchscreens that include displays that accept input by touch of fingers or a stylus.

SUMMARY

This disclosure may disclose, inter alia, methods and systems for providing functionality of an interface to control directional orientations of a device.

In one example, a method is provided that comprises receiving an input on an interface indicating a command for a directional orientation of a robotic device, and providing an indicator on the interface representing a location of the input. The indicator may include a representation of the command for the directional orientation of the robotic device. The method may also include determining that the location of the input on the interface is within a predetermined threshold (e.g., a distance) to a pre-set location on the interface, and repositioning the indicator on the interface to be at the pre-set location.

Any of the methods described herein may be provided in a form of instructions stored on a non-transitory, computer readable medium, that when executed by a computing device, cause the computing device to perform functions of the method. Further examples may also include articles of manufacture including tangible computer-readable media that have computer-readable instructions encoded thereon, and the instructions may comprise instructions to perform functions of the methods described herein.

In one example, a non-transitory computer readable medium having stored thereon instructions executable by a computing device to cause the computing device to perform functions is provided. The functions comprise receiving an input on an interface indicating a command for a directional orientation of a robotic device, and providing an indicator on the interface representing a location of the input. The indicator may include a representation of the command for the directional orientation of the robotic device. The functions also may comprise determining that the location of the input on the interface is within a predetermined threshold to a pre-set location on the interface, and repositioning the indicator on the interface to be at the pre-set location.

The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage medium.

In addition, circuitry may be provided that is wired to perform logical functions in any processes or methods described herein.

In still further examples, any type of devices may be used or configured to perform logical functions in any processes or methods described herein.

In one example, a device is provided that comprises a processor, and memory including instructions stored therein executable by the processor to perform functions. The functions comprise receiving an input on an interface indicating a command for a directional orientation of a robotic device, and providing an indicator on the interface representing a location of the input. The indicator may include a representation of the command for the directional orientation of the robotic device. The functions also comprise determining that the location of the input on the interface is within a predetermined threshold to a pre-set location on the interface, and repositioning the indicator on the interface to be at the pre-set location.

In yet further examples, any type of devices may be used or configured as means for performing functions of any of the methods described herein (or any portions of the methods described herein).

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for providing functionality of a user interface to control directional orientations of a device. An example method includes receiving an input on an interface indicating a command for a directional orientation of a robotic device, and providing an indicator on the interface representing a location of the input. The indicator may include a representation of the command for the directional orientation of the robotic device, and may be positioned in areas other than the location of the input to be viewed by the user in instances in which the interface is provided on a touchscreen display and the input on the interface is received at a location of contact/touch to the interface. The method may further include determining that the location of the input on the interface is within a distance threshold to a pre-set location on the interface, and repositioning the indicator on the interface to be at the pre-set location. In this manner, the indicator may snap to a location if the input is close to a pre-set location, for example.

Figure 1:
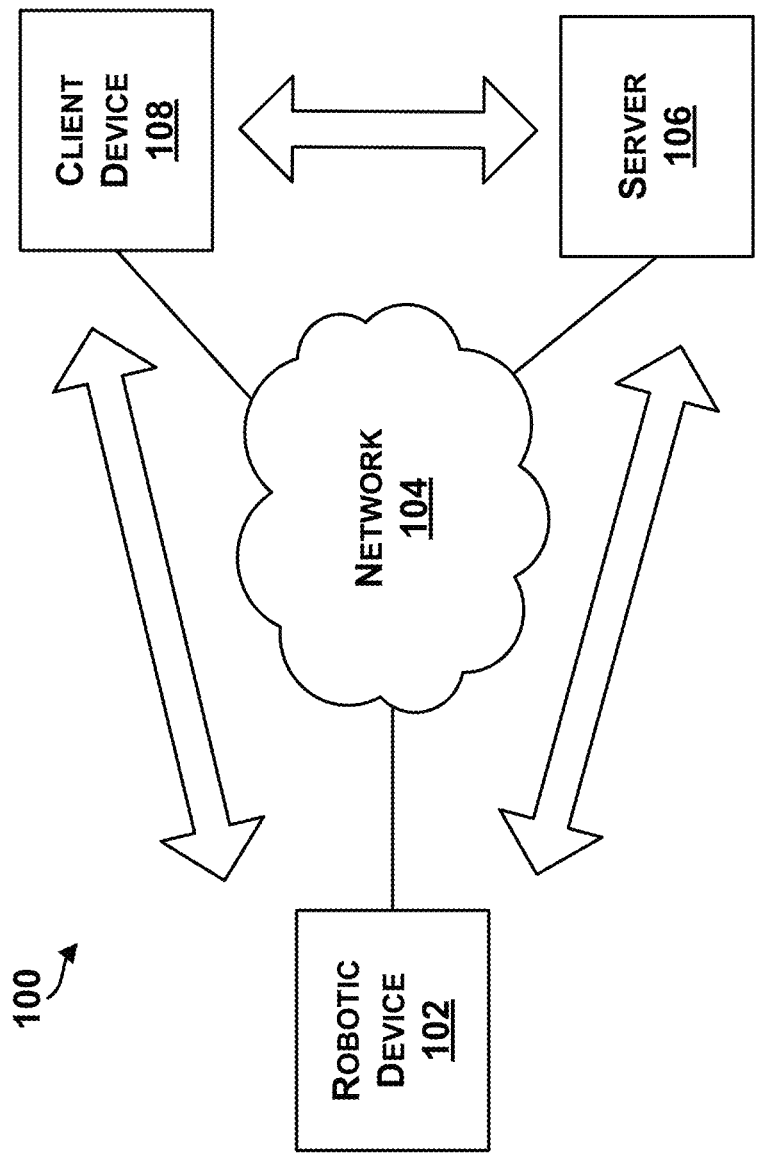
FIG. 1 is an example system for generating and modifying a view of a robotic device.

Referring now to the figures, FIG. 1 is an example system 100 for generating and modifying a view of a robotic device. The system 100 includes a robotic device 102 coupled to a network 104, and a server 106 and a client device 108 also coupled to the network 104. The robotic device 102 may further be coupled directly (or indirectly) to the server 106 and the client device 108 as shown. The system 100 may include more of fewer components, and each of the robotic device 102, the server 106, and the client device 108 may comprise multiple elements as well. Thus, one or more of the described functions of the system 100 may be divided up into additional functional or physical components, or combined into fewer functional or physical components. In some further examples, additional functional and/or physical components may be added to the examples illustrated by FIG. 1.

The system 100 may enable cloud-based computing. Cloud-based computing generally refers to networked computer architectures in which application execution and storage may be divided, to some extent, between client and server devices. A "cloud" may refer to a service or a group of services accessible over a network (e.g., Internet) by client and server devices, for example. Cloud-based computing can also refer to distributed computing architectures in which data and program logic for a cloud-based application are shared between one or more client devices and/or server devices on a near real-time basis. Parts of this data and program logic may be dynamically delivered, as needed or otherwise, to various clients accessing the cloud-based application. Details of the architecture may be transparent to users of client devices. Thus, a PC user or robot client device accessing a cloud-based application may not be aware that the PC or robot downloads program logic and/or data from the server devices, or that the PC or robot offloads processing or storage functions to the server devices, for example.

The system 100 includes a number of devices coupled to or configured to be capable of communicating with the network 104. Of course, more or fewer client devices may be coupled to the network 104. In addition, different types of devices may be coupled to the network 104. For example, any of the devices may generally comprise a display system, memory, and a processor.

Any of the devices shown in FIG. 1 may be coupled to the network 104 or to each other using wired or wireless communications. For example, communication links between the network 104 and devices may include wired connections, such as a serial or parallel bus. Communication links may also be wireless links, which may include Bluetooth, IEEE 802.11 (IEEE 802.11 may refer to IEEE 802.11-2007, IEEE 802.11n-2009, or any other IEEE 802.11 revision), or other wireless based communication links. In other examples, the system 100 may include access points through which the devices may communicate with the network 104. Access points may take various forms, for example, an access point may take the form of a wireless access point (WAP) or wireless router. As another example, if a client device connects using a cellular air-interface protocol, such as a CDMA or GSM protocol, an access point may be a base station in a cellular network that provides Internet connectivity via the cellular network.

As such, the robotic device 102, the server 106, and the client device 108 may include a wired or wireless network interface through which the devices can connect to the network 104 (or access points). As an example, the devices may be configured use one or more protocols such as 802.11, 802.16 (WiMAX), LTE, GSM, GPRS, CDMA, EV-DO, and/or HSPDA, among others. Furthermore, the client devices may be configured use multiple wired and/or wireless protocols, such as "3G" or "4G" data connectivity using a cellular communication protocol (e.g., CDMA, GSM, or WiMAX, as well as for "WiFi" connectivity using 802.11). Other examples are also possible.

The network 104 may represent a networked computer architecture, and in one example, the network 104 represents a queue for handling requests from client devices. The network 104 may further include any of a local area network (LAN), wide area network (WAN), wireless network (Wi-Fi), or Internet, for example.

The server 106 may be a component coupled to the network 104 (as shown), or a component of the network 106 depending on a configuration of the system 100. The server 106 may include a processor and memory including instructions executable by the processor to perform functions as described herein.

The client device 108 may include any type of computing device (e.g., PC, laptop computer, etc.), or any type of mobile computing device (e.g., laptop, mobile telephone, cellular telephone, etc.). The client device 108 may include a processor and memory including instructions executable by the processor to perform functions as described herein.

The robotic device 102 may comprise any computing device that may include connection abilities to the network 104 and that has an actuation capability (e.g., electromechanical capabilities). A robotic device may further be a combination of computing devices. In some examples, the robotic device 102 may collect data and upload the data to the network 104. The network 104 may be configured to perform calculations or analysis on the data and return processed data to the robotic device 102.

Any of the client devices may include additional components. For example, the robotic device 102 may include one or more sensors, such as a gyroscope, an accelerometer, or distance sensors to measure movement of the robotic device 102. Other sensors may further include any of Global Positioning System (GPS) receivers, infrared sensors, optical sensors, biosensors, Radio Frequency identification (RFID) systems, wireless sensors, and/or compasses, among others, for example.

In addition, any of the robotic device 102, the server 106, and the client device 108 may include an integrated user-interface (UI) that allows a user to interact with the device. For example, the robotic device 102 may include various buttons and/or a touchscreen interface that allow a user to provide input. As another example, the robotic device 102 may include a microphone configured to receive voice commands from a user. Furthermore, the robotic device 102 may include one or more interfaces that allow various types of user-interface devices to be connected to the robotic device 102.

Figure 2A:
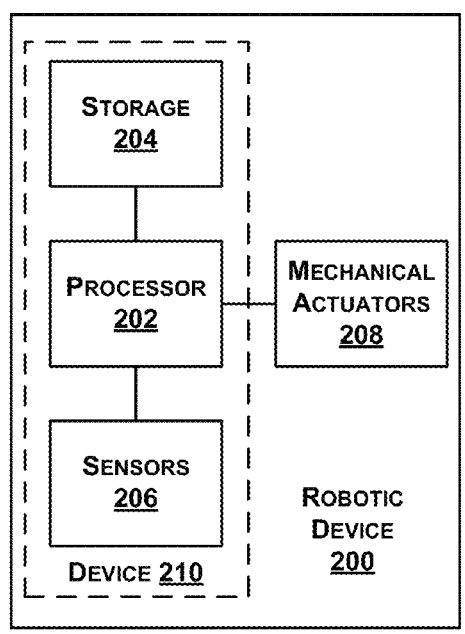
FIG. 2A-2C are example illustrations of robotic devices.

FIG. 2A illustrates an example robotic device 200. In one example, the robotic device 200 is configured as a robot. In some examples, a robot may contain computer hardware, such as a processor 202, memory or data storage 204, and one or more sensors 206. For example, a robot controller (e.g., processor 202, computing system, and sensors 206) may all be custom designed for a specific robot. The robot may have a link to access cloud servers (as shown in FIG. 1). A wired link may include, for example, a parallel bus or a serial bus such as a Universal Serial Bus (USB). A wireless link may include, for example, Bluetooth, IEEE 802.11, Cellular (such as GSM, CDMA, UMTS, EV-DO, WiMAX, or LTE), or Zigbee, among other possibilities.

In one example, the storage 204 may be used for compiling data from various sensors 206 of the robotic device 200 and storing program instructions. The processor 202 may be coupled to the storage 204 and may be configured to control the robotic device 200 based on the program instructions. The processor 202 may also be able to interpret data from the various sensors 206 on the robot. Example sensors may include a camera, smoke sensors, light sensors, radio sensors, infrared sensors, microphones, speakers, gyroscope, accelerometer, distance sensors, a camera, radar, capacitive sensors and touch sensors, etc. Example distance sensors include infrared ranging sensors, photoelectric distance sensors, proximity sensors, ultrasonic sensors, radar, or other types of sensors that may provide outputs used to determine a distance of the robotic device 200 to an object.

The robotic device 200 may also have components or devices that allow the robotic device 200 to interact with its environment. For example, the robotic device 200 may have a camera to provide images of a field of view of the environment as well as mechanical actuators 208, such as motors, wheels, movable arms, etc., that enable the robotic device 200 to move or interact with the environment.

In some example, various sensors and devices on the robotic device 200 may be modules. Different modules may be added or removed from the robotic device 200 depending on requirements. For example, in a low power situation, a robot may have fewer modules to reduce power usages. However, additional sensors may be added as needed. To increase an amount of data a robot may be able to collect, additional sensors may be added, for example.

In some example, the robotic device 200 may be configured to receive a device, such as device 210, that includes the processor 202, the storage 204, and the sensors 206. For example, the robotic device 200 may be a robot that have a number of mechanical actuators (e.g., a movable base), and the robot may be configured to receive a mobile telephone to function as the "brains" or control components of the robot. The device 210 may be considered a module of the robot. The device 210 may be physically attached to the robot or in communication with the robot. For example, a mobile phone may sit on a robot's "chest" and form an interactive display. The device 210 may provide a robot with sensors, a wireless link, and processing capabilities, for example. The device 210 may allow a user to download new routines for his or her robot from the cloud. For example, a laundry folding routine may be stored on the cloud, and a user may be able to select this routine using a mobile phone to download the routine from the cloud, and when the mobile phone is placed into or coupled to the robot, the robot would be able to perform the downloaded action.

In some examples, the robotic device 200 may be coupled to a mobile or cellular telephone to provide additional sensing capabilities. The cellular phone may not be physically attached to the robot, but may be coupled to the robot wirelessly. For example, a low cost robot may omit a direct connection to the internet. This robot may be able to connect to a user's cellular phone via a wireless technology (e.g., Bluetooth) to be able to access the internet. The robot may be able to access various sensors and communication means of the cellular phone. The robot may not need as many sensors to be physically provided on the robot, however, the robot may be able to keep the same or similar functionality.

Thus, the robotic device 200 may include mechanical robot features, and may be configured to receive the device 210 (e.g., a mobile phone), which can provide additional peripheral components to the robotic device 200, such as any of an accelerometer, gyroscope, compass, GPS, camera, WiFi connection, a touch screen, etc., that are included within the device 210.

Figure 2B:
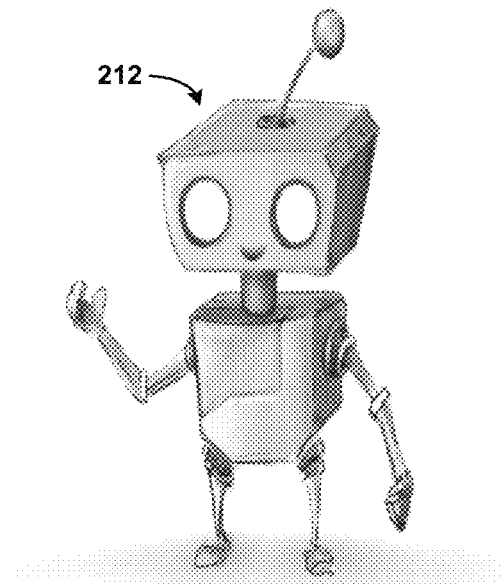

FIG. 2B illustrates a graphical example of a robot 212. In FIG. 2B, the robot 212 is shown as a mechanical form of a person including arms, legs, and a head. The robot 212 may be configured to receive any number of modules or components, such a mobile phone, which may be configured to operate the robot. In this example, a device (e.g., robot 212) can be attached to a mobile phone (e.g., device 210) to provide the mechanical robot 212 with functionality enabling the robot 212 to communicate with the cloud to cause operation/functions of the robot 212. Other types of devices that have connectivity to the Internet can be coupled to robot 212 to provide additional functions on the robot 212. Thus, the device 210 may be separate from the robot 212 and can be attached or coupled to the robot 212.

In one example, the robot 212 may be a toy with only limited mechanical functionality, and by connecting device 210 to the robot 212, the toy robot 212 may now be capable of performing a number of functions with the aid of the device 210 and/or the cloud. In this manner, the robot 212 (or components of a robot) can be attached to a mobile phone to transform the mobile phone into a robot (e.g., with legs/arms) that is connected to a server to cause operation/functions of the robot.

Figure 2C:
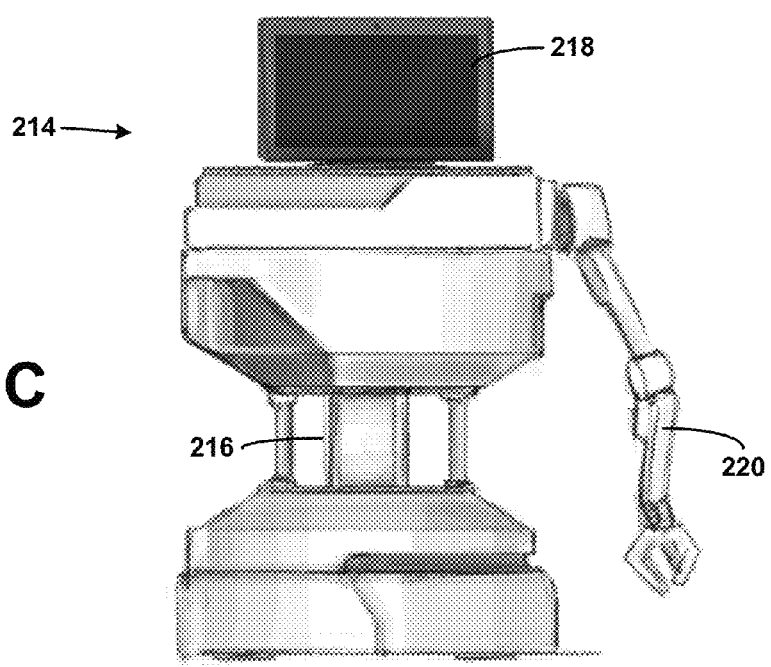

FIG. 2C illustrates another example of a robot 214. The robot 214 includes a computing device 216, sensors 218, and a mechanical actuator 220. In this example, the computing device 216 may be a laptop computer, which may be coupled to the sensors 218. The sensors 218 may include a camera, infrared projectors, and other motion sensing or vision sensing elements. The sensors 218 may be included within a tablet device, which may also function as the computing device 216. The mechanical actuator 220 may include a base, wheels, and a motor upon which the computing device 216 and the sensors 218 can be positioned, for example.

Any of the robots illustrated in FIGS. 2A-2C may be configured to operate according to a robot operating system (e.g., an operating system designed for specific functions of the robot). A robot operating system may provide libraries and tools (e.g., hardware abstraction, device drivers, visualizers, message-passing, package management, etc.) to enable robot applications. Examples of robot operating systems include open source software such as ROS (robot operating system), DROS, or ARCOS (advanced robotics control operating system); proprietary software such as the robotic development platform ESRP from Evolution Robotics® and MRDS (Microsoft® Robotics Developer Studio), and other examples also include ROSJAVA. A robot operating system may include publish and subscribe functionality, and may also include functionality to control components of the robot, such as head tracking, base movement (e.g., velocity control, navigation framework), etc.

Figure 3:
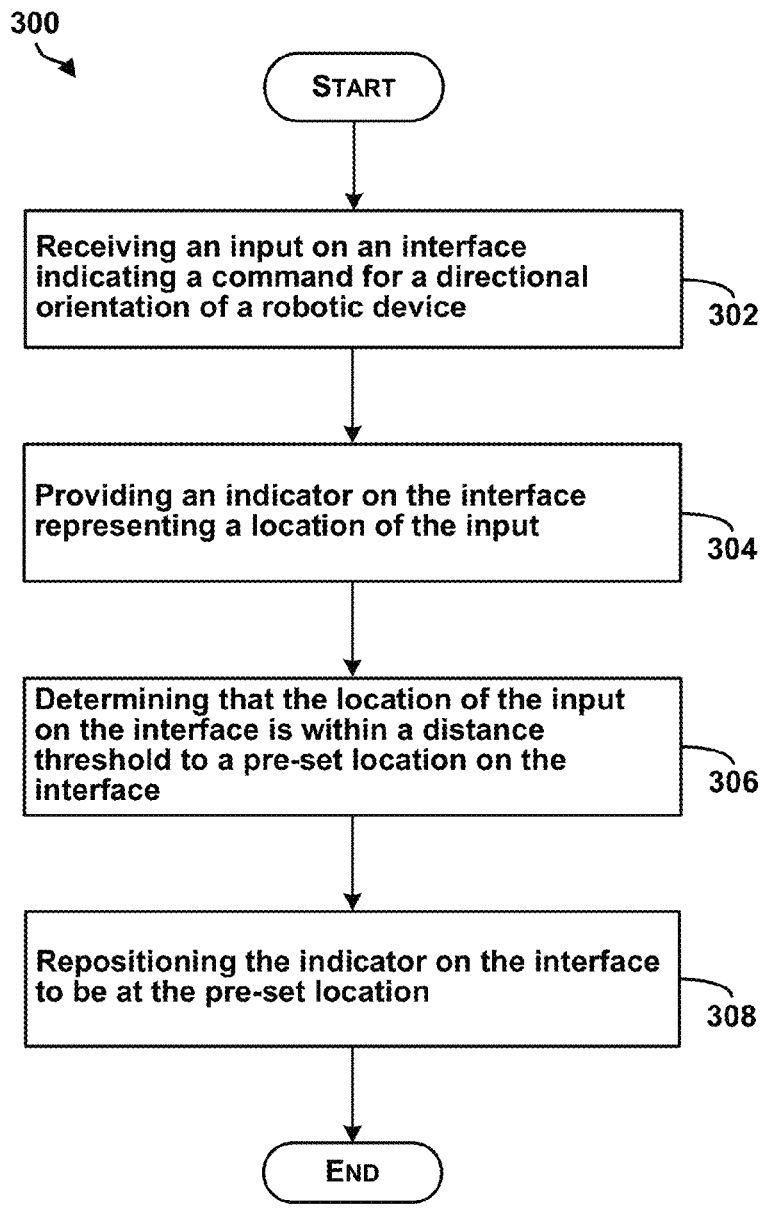
FIG. 3 is a block diagram of an example method of providing functionality of an interface to control directional orientations of a device.

FIG. 3 is a block diagram of an example method of providing functionality of an interface to control directional orientations of a device. Method 300 shown in FIG. 3 presents an embodiment of a method that, for example, could be used with the system 100, for example, and may be performed by a device, such as any devices illustrated in FIGS. 1-2, or components of the device. Method 300 may include one or more operations, functions, or actions as illustrated by one or more of blocks 302-308. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

At block 302, the method 300 includes receiving an input on an interface indicating a command for a directional orientation of a robotic device. In one example, the interface may be provided on a touchscreen display of a device, and the device may receive an input to the interface via a touch/contact to the touchscreen by a user or stylus. As another example, the interface may include a graphical user interface (GUI) of a device, and the device may receive an input to the interface via an input to a keyboard or mouse coupled to the device. As still another example, the interface may be a general interface to a device, and the device may receive an input via receiving a signal (via a wireless or wired connection) to the interface (e.g., which may take the form of a receiver, a port, etc.).

The interface may be configured to indicating a command for a directional orientation of a robotic device. Thus, inputs to the interface may be associated with directional orientations of a robotic device including directional orientations used to control movement of the robotic device, and the interface may be configured to associated inputs with corresponding commands that can be used to control operation of the robotic device. The interface may thus take the form of an interface enabling a user to remote control the robotic device.

At block 304, the method 300 includes providing an indicator on the interface representing a location of the input. For example, the indicator may be provided on the interface at or near the location of the input. In instances in which the interface is provided on a touchscreen, the indicator may be provided at a location surrounding a location of the input. This enables a user to view the indicator, since an indicator placed at the location of the input would be placed underneath a user's finger or stylus that provides contact with the touchscreen, and which may block or obstruct a view of an indicator placed at the location of the input.

The indicator may include a representation of the command for the directional orientation of the robotic device. For example, based on a configuration of the interface, the indicator can be representative of the command, such as indicating to turn right/left, go forward/backward, etc.

As one example, the interface may include a circle and the indicator may include a marking outside the circle. The circle may include a frame of reference such that a top indicates a forward movement of the robotic device, a bottom indicates a reverse movement of the robotic device, and a left/right indicate a left/right movement of the robotic device. Areas of the circle may additionally or alternatively indicate a direction in which to turn the robotic device, or also may be representative of directional orientations of the robotic device. In these examples, the indicator may be provided outside the circle and the location of the indicator represents movement or directional orientation of the robotic device to provide feedback to the user.

The interface may be configured in other manners as well, and may take the form or other geometric shapes or designs based on applications.

In other examples, multiple inputs may be received on the interface over time indicating commands for the directional orientation of the robotic device, and multiple indicators may be provided on the interface that each include a representation of the command for the directional orientation of the robotic device. For instance, the interface may be presented on a touchscreen and the user may provide an initial input by contacting the touchscreen using a finger, and then slide the finger across the interface to provide multiple inputs. Indicators may be provided to represent locations of some or all received inputs. One or more indicators may represent a previous location of an input on the interface, and one or more indicators may represent a current location of the input on the interface. Further, one or more indicators may represent a future location of a projected future input on the interface.

In further examples, as the multiple inputs on the interface are received over time, a display of one or more of the indicators that represents the previous location of the input on the interface may fade-out over time. In a similar manner, a display of an indicator that represents the future location of the projected future input on the interface may fade-in over time.

At block 306, the method 300 includes determining that the location of the input on the interface is within a distance threshold to a pre-set location on the interface. For example, a determination is made whether the location of the input is closed to a pre-set location. Depending on a configuration or form of the interface, the pre-set location may correspond to the directional orientation of the robotic device to be forward, reverse, right, or left with respect to an orientation of the robotic device.

As one example, the interface includes a circle configured such that a center of the circle is at an intersection of two perpendicular axes (e.g., overlays an x-y axis grid). The pre-set location on the interface may include a location on one of the two perpendicular axes that intersects the circle or is outside the circle, such as a location at an axis on the circle or on the axis outside the circle. The pre-set location may include a location on or outside a circumference of the circle at one of 0 degrees, 90 degrees, 180 degrees, and 270 degrees, with respect to the x-y axis of the circle.

As another example, the interface may include a geometric shape configured to overlay an x-y axis, and the pre-set location on the interface may include a location on one of the x-y axis that intersects the geometric shape or is outside the geometric shape.

In some examples, the pre-set location on the interface may correspond to a specific direction of movement or orientation of the robotic device, or may correspond to guides or signposts for the robotic device as well. For instance, the pre-set location may relate to a movement of the robotic device straight down a hallway, road, etc., and thus, is indicative of an auto-orientation in a forward direction that does not veer to the left or right. The auto-orientation may be any orientation as predetermined by a server or a user, for example.

The distance threshold may be any distance, and may be configured by a user. As an example, in an instance in which the interface is configured in a circular form (e.g., circle, oval, etc.) or has arcs, the threshold distance may be about 5 degrees to about 15 degrees. As another example, the distance threshold may be associated with a linear distance, and may be about 1 mm to about 15 mm. As still another example, the distance threshold may be a linear distance or a radial distance and may be determined based on a size of a display on which the interface is provided. The distance threshold may thus be adjusted according to a size of the display. The distance threshold may also a distance related to a percentage of a size of the interface, such as about 1% to about 5% (e.g., the size of the interface may be a circle with a diameter of 3 cm, and the distance threshold may be about 3 mm to about 15 mm).

In further examples, the distance threshold may be based on a speed of the robotic device. For example, as the speed of the robotic device increases, the distance threshold may increase such that the indicator (and thus, the input) may snap-to a pre-set location within a larger range of distances. In contrast, as the speed of the robotic device decreases, the distance threshold may decrease. Thus, in examples, the distance threshold may be adaptive to the speed of the robotic device.

The device on which the interface is provided may determine the speed of the robotic device based on inputs to the interface. In some examples, the input to the interface may be indicative of a command for a directional orientation of the robotic device as well as a speed of the robotic device. Thus, a location of the input can be associated with a speed, and used to determine the distance threshold.

The distance threshold may also have a tolerance based on safety margins of error, such as about ±1% of distance of the threshold, for example, so that when the input is within the distance threshold margin, the input can be determined to be within the distance threshold.

In some examples, a location of the input may change to a second location on the interface, such as when a user slides a finger across the interface. In such an example, it can be determined whether the second location on the interface is within the distance threshold to the pre-set location on the interface. Thus, a device operating the interface may continuously make a determination whether an input is within the distance threshold. Alternatively, the device may make the determination at time intervals, or when an input is received, for example.

In further examples, when subsequent inputs are received on the interface a location of the indicator on the interface may be modified to substantially match a location of a subsequent input on the interface.

At block 308, the method 300 includes repositioning the indicator on the interface to be at the pre-set location. For example, the indicator may initially be provided at a location representing the input, and if the input is determined to be within the threshold distance to the pre-set location, the indicator may be repositioned to be at the pre-set location. As a specific example, the pre-set location may correspond to an axis on the interface, and the indicator may be repositioned to the axis so as to "snap to" the axis when the input is close to the axis.

In further examples, the method 300 may include providing one or more of an audio or vibration indicator that is indicative of repositioning the indicator on the interface to be at the pre-set location. The audio or vibration signal may provide feedback to a user indicating that the change to the interface has been made.

In some examples, the method 300 may further include providing on the interface a display of a region surrounding the pre-set location that is indicative of the distance threshold. A user may then visualize the distance threshold and have information indicating when the snap-to feature may be activated, for example. The region may be displayed at all times, or may be displayed as inputs on the interface approach the pre-set location.

In still further examples, the method 300 may include providing on the interface text that indicates the command for the directional orientation of the robotic device. The text may provide further feedback to the user indicating the command that corresponds to a received input.

The method may be performed by a device to control operation of a robotic device. The device may include a processor and memory including instructions stored therein executable by the processor to perform functions of the method 300. The device may be remote from the robotic device, and may send signals (either via a wired or wireless connection) to the robotic device. Thus, the interface may be provided by or on the device. The device may include a touchscreen display configured to receive the input on the interface, and based on the input, the device may be configured to generate a control signal for the command for the directional orientation of the robotic device. The device may subsequently provide the control signal to the robotic device. The method 300 may be performed to operate any type of robotic device, including robotic devices that may be configured to turn in place or not, or have other functionality or limitations.

Figure 4A:
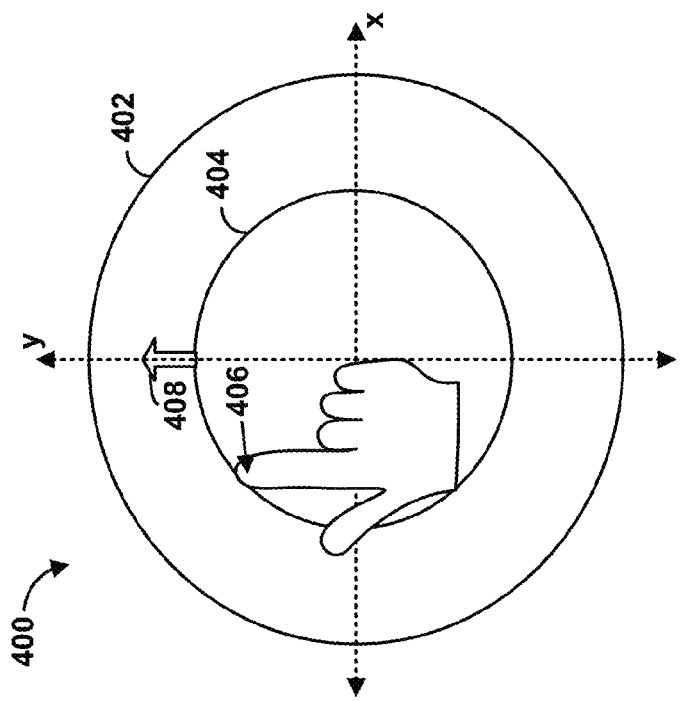
FIGS. 4A-4B are example illustrations of an interface.
Figure 4B:
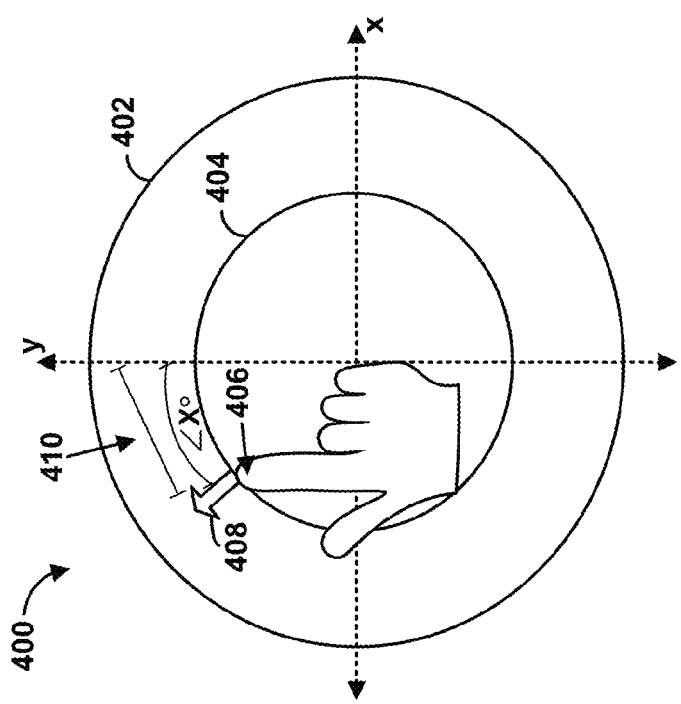

FIGS. 4A-4B are example illustrations of an interface 400. The interface 400 may be provided on a display of a device, and may be configured to receive inputs and correlate the inputs to commands for a directional orientation of a robotic device that is remote from the device. In some examples, while controlling operation of a robotic device, it is desirable to precisely select a desired orientation of movement. The interface 400 may be configured to enable precise selection of a desired orientation of movement, and may provide tactile feedback to a user. The interface 400 may also lessen the need for a user to constantly provide correction commands to correct orientation or oscillating behavior of a robotic device.

The interface 400 includes two concentric circles 402 and 404 that may be representative of a range of motion of the robotic device, or a range of directional orientation of the robotic device. For example, a robotic device may be capable of a full 360°, and the interface 400 may be configured to receive inputs at any location.

The interface 400 may receive an input from a user's finger or from a stylus at a location 406. The interface 400 may be configured to provide an indicator 408 at a location representing the location of the received input. As shown in FIG. 4A, the interface 400 may be configured to be provided on a touchscreen, and a user may provide an input at the location 406. The indicator 408 is provided adjacent the location 406 so as to represent the input. In this way, a user may view the indicator 408, rather than providing the indicator exactly at the location 406 in which the indicator 408 would be provided underneath the user's finger. In alternative examples, the indicator 408 may be provided at the location 408 and may be of a size such that a user can view the indicator 408.

The location 406 of the input may be compared to pre-set locations on the interface 400. Example pre-set locations include locations where the concentric circles 402 and 404 intersect either the x axis or y axis. A distance 410 from the location 406 of the input can be determined and compared to a distance threshold. When the distance 410 is greater than the distance threshold, no action may occur. However, when the distance 410 is less than the distance threshold, the indicator 408 may be repositioned on the interface to be at a pre-set location. FIG. 4B illustrates an example in which the distance 410 is less than the distance threshold to the pre-set location on the y-axis, in which case the indicator 408 is repositioned to the pre-set location.

In examples, using the interface 400, inputs may be received and an auto-snap function may be activated to the major axes when the input is within a delta distance from the major axes. As another example, when the input is between about 80 degrees and 100 degrees, the auto-snap feature may set the orientation to be 90 degrees. The auto-snap feature may be used for the major axes since those are commonly used for longer durations for directional control of the robotic device.

Figure 5:
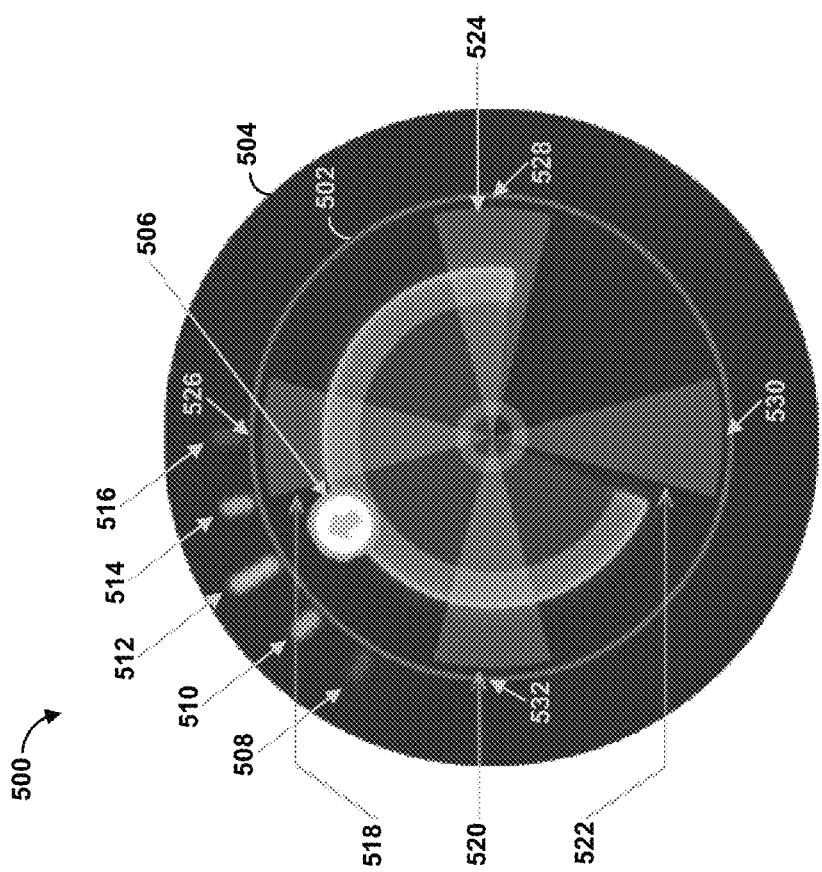
FIG. 5 is another example illustration of an interface.

FIG. 5 is another example illustration of an interface 500. The interface 500 includes two concentric circles 502 and 504 that may provide a structure for the interface 500. An input may be provided at a location 506, and an indicator (e.g., an arrow enclosed in a circle) may be provided at the location 506. The indicator may include other graphics or designs as well.

The interface 500 further includes indicators 508, 510, 512, 514, and 516 (508-516) provided at a location representing the location 506 of the input. As shown in FIG. 5, the indicators 508-516 may be provided outside the circle 502, for example. Each of the indicators 508-516 may represent different locations. In one example, the indicators 508-516 indicate a range of immediate motion of the robotic device. In another example, the indicators 508-516 are representative of previous input locations, a current input location, and a future projected input location. The future projected input may be determined to be at a location in a path or trajectory of motion of the input (e.g., if the input is moving clockwise, a future projected input location may be a location ahead of a current location in the clockwise direction).

The interface 500 further includes a number of regions 518, 520, 522, and 524 (518-524). The regions 518-524 may be configured to indicate distance thresholds to pre-set locations, such as pre-set locations 526, 528, 530, and 532 (526-532). Thus, the regions 518-524 provide visual indicators to a user indicating when a snap-to feature may be activated. The regions 518-524 may or may not be provided on a continuous basis, but rather, one or more of the regions 518-524 may be provided when an input on the interface approaches a given region. Although the regions 518-524 are illustrated as cones, the regions 518-524 may take other forms as well. Furthermore, arcs of the regions 518-524 are shown to be about 30 degrees (e.g., about 15 degrees on each side of an axis); however, other sizes may be used as well. The regions 518-524 may dictate a range in which the snap-to-axes feature may be activated. The regions 518-524 may further be configured to be provided substantially adjacent the pre-set locations or surrounding the pre-set locations. In still further examples, the regions 518-524 may be provided on one side of the pre-set location, such that that using the example shown in FIG. 5, the regions 518-524 may be about 15 degrees wide (e.g., half as wide and on one side of the pre-set location).

In examples, using the interface 500, a device may receive an input at the location 506, and the device may receive subsequent inputs sliding across the interface toward the pre-set location 526. Once an input is received that is at a location less than the distance threshold, or that is within the region 518, the interface may reposition the indicator 512 to be at the pre-set location 526. The positioning of the indicator 512 at the pre-set location 526 may include providing the indicator 512 on a circumference of the circle 502 or outside the circle, for example.

Figure 6A:
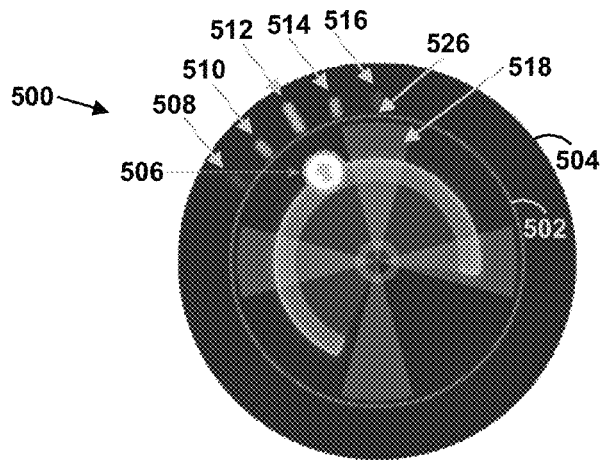
FIGS. 6A-6C are example illustrations of the interface in FIG. 5.
Figure 6B:
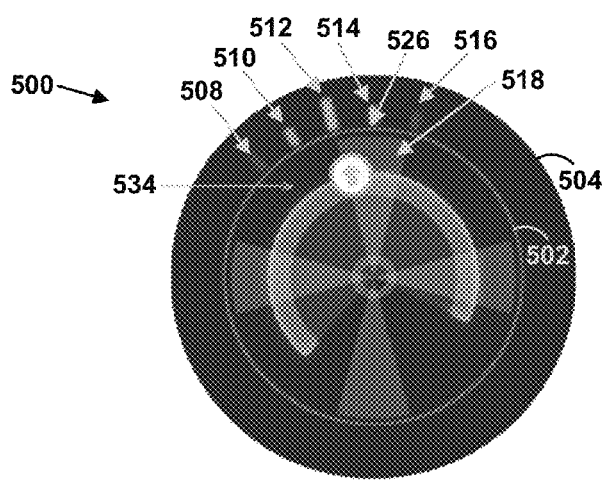
Figure 6C:
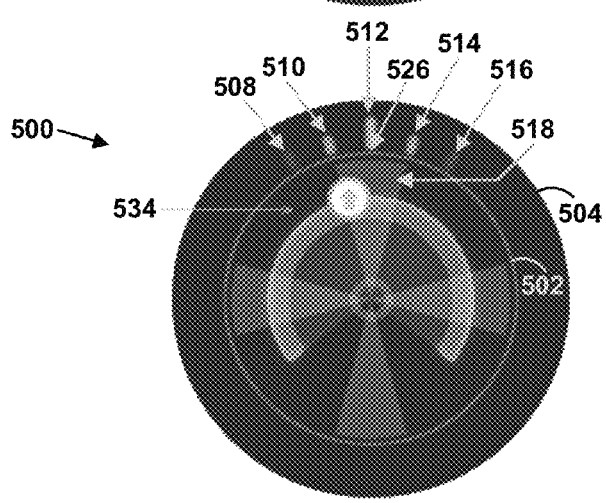

FIGS. 6A-6C are example illustrations of the interface 500. In FIG. 6A, the interface 500 receives an input at the location 506, and provides the indicators 508-516 as described in FIG. 5. The indicator 512 is representative of a current location of the input, and thus, is of a longer length and darker color.

In FIG. 6B, the interface 500 receives an input at location 534. In one example, a user may slide a finger on a touchscreen from the location 506 to the location 534. The indicators 508-514 may follow the input from the location 506 to the location 534, such that the indicator 512 is provided at the location 534. As the interface 500 receives inputs, the indicators 508-514 may be provided to follow the inputs. The indicators 508 and 510 may be representative of prior locations of inputs, and over time may fade away, while the indicators 514 and 516 may be representative of future projected input locations and may fade in over time. The indicators 508 and 510 may be considered a "tail" of the indicators that represent a trail or previous positions of the indicators 508-516.

In FIG. 6B, the location 534 is now within the region 518, and it may be determined that the location 534 of the input is less than the distance threshold to the pre-set location 526.

In FIG. 6C, the input is still received at the location 534. However, the indicator 512 is now repositioned to be substantially at the pre-set location 526. As shown, the indicator 512 may be repositioned to be adjacent the pre-set location 526. In addition, the other indicators 508, 510, 514, and 516 may be repositioned adjacent the indicator 512. In this manner, although the input is at location 534, the indicator 512 is repositioned to be at the pre-set location 526.

The interface 500 may be configured to generate a command according to a location of the indicator 512, for example. Thus, the interface 500 may receive inputs, such as at location 534, and the interface 500 may reposition the indicator 512 to be at the pre-set location 526 because the input location 534 is within the region 518 (or is within a distance threshold of the pre-set location 526). The device may then generate a command according to the location of the indicator 512, which may indicate a directional orientation of a robotic device. The directional orientation may be indicative of a direction that the robotic device turns, or a direction that the robotic device moves.

Thus, as shown in examples in FIGS. 6A-6C, when an input to the interface 500 enters the region 518, an auto-snap feature is triggered causing the indicators 508-516 to be repositioned according to the pre-set location 526 (e.g., to be aligned with the y-axis indicating that an angular direction/velocity command will instruct the robotic device to move straight and not slightly to the left), even though the input to the interface 500 is at location 534 (e.g., is not on the y-axis).

In further examples, the interface 500 may be indicative of a directional orientation of components of the robotic device. For example, the directional orientation may be directed to a base of the robotic device that controls movement of the robotic device, mechanical actuators of the robotic device (such as an arm, etc.), a sensor of a robotic device (e.g., camera, speaker, microphone, etc.), or any other components of the robotic device that may be configured to have an orientation controlled or adjusted.

In further examples, the interface 500 may be configured to provide additional information or feedback to a user. A robotic device may be controlled to move in a direction and may encounter an obstacle. A device providing the interface 500 may receive from the robotic device information indicating a proposed change in the directional orientation of the robotic device. For example, the information may indicate a location of the obstacle. The device may determine the proposed change in the directional orientation of the robotic device, such as to alter a path to avoid the obstacle, and may provide on the interface a representation of the proposed change in the directional orientation of the robotic device. The interface 500 may be configured to receive an input indicating an acceptance or denial of the proposed change in the directional orientation of the robotic device.

As a specific example, the device may provide commands to the robotic device, based on inputs to the interface 500, indicating to move the robotic device down a hallway. If the inputs to the interface 500 correspond to commands that direct the robotic device 5 degrees off center, for example, the robotic device may veer to the left/right and approach a wall. The device or the robotic device may determine a proposed change to the direction of movement of the robotic device and provide feedback via the interface to offer the proposed change in the directional orientation of the robotic device that can be accepted (if it is desired for the robotic device to continue straight down the hallway) or denied (if it is desired for the robotic device to approach the wall). The interface 500 may thus be configured to provide assisted tele-operation of the robotic device, and may provide feedback or alerts to indicate what is occurring and to provide an opportunity to override proposed changes.

In examples herein, interfaces are provided that may be configured to both receive inputs as well as provide outputs (e.g., touchscreen displays). For instance, an interface may be provided on a handheld computer that can receive an input and provide a display representative of the output.

In other examples, interfaces may be provided that are configured to receive inputs, and outputs may be provided by other devices. For instance, a motion-detection device may be configured to receive an input and to provide the input to a display device which displays an output representative of the input. The motion-detection device may include a camera, a depth sensor, microphones, etc., and may be configured to provide motion capture, facial recognition, and voice recognition capabilities. The depth sensor may be configured to include an infrared laser projector and a monochrome CMOS sensor that can capture video data in 3D under ambient light conditions. The motion-detection device may be configured to provide an interface using the infrared laser projector, for example, to receive inputs from users. The inputs can be associated with indicating a command for a directional orientation of a robotic device that is remote from the motion-detection device. The interface may be viewable by a user, such as a laser projected interface, or may be a conceptual interface in which inputs are received due to motion of the user and the interface is not visible to the user.

The motion-detection device may be coupled to a display device, and may provide outputs to the display device. The motion-detection device may generate a display representative of the interface or representative of inputs to the interface, and provide the display to the display device (or may provide information associated with the inputs to the display device and the display device can generate the display). The display may include an indicator representing a location of a received input, and the indicator may be representative of the command for the directional orientation of the robotic device. The location of the received input can be associated with a physical or geographic location, or can be associated with a location on the display representative of the interface that maps to the location of the received input. For instance, a user may provide an input to the interface provided by the motion-detection device at a physical location, and the physical location can be mapped to a position on a display representative of the interface.

The motion-detection device or the display device may further be configured to determine that the location of the input at the interface is within a predetermined threshold to a pre-set location associated with the interface. For example, a pre-set location associated with the interface provided by the motion-detection device may be a physical or geographic location in an area. The physical or geographic location in the area can be mapped to a location on the display representative of the interface that corresponds to a pre-set configuration of the orientation of the camera on the robotic device, as described herein.

The motion-detection device or the display device may be further configured to generate (or provide) a display of the indicator on the display representative of the interface repositioned to be at a location representing (or associated with) the pre-set location.

Thus, in some examples, a first device may be configured to receive an input at an interface that may be provided by or on the first device, and a second device different from the first device may be configured to provide an output based on the input. As a specific example, a motion-detection device may receive an input, and an output can be provided on a display device coupled (either wired or wirelessly) to the motion-detection device. As another example, a user may provide an input on a device (e.g., a keyboard, mobile phone, computing device, etc.) that is coupled to a separate device (e.g., a display) on which an output is provided.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
receiving an input on an interface indicating a command for a directional orientation of a robotic device and a command for a speed of the robotic device, wherein the interface is provided on a device remote from the robotic device, and wherein particular pre-set locations on the interface at particular orientations with respect to a center of the interface correspond to commands for predetermined directional orientations of the robotic device with respect to a current orientation of the robotic device;
providing an indicator on the interface representing a location of the input, wherein the interface includes a geometric shape, wherein the location of the input is within the geometric shape, and wherein the indicator includes a marking outside the geometric shape that is indicative of the command for the directional orientation of the robotic device;
determining that the location of the input on the interface is within a predetermined threshold to one of the particular pre-set locations on the interface; and
responsive to determining that the location of the input on the interface is within the predetermined threshold to the pre-set location, repositioning the marking outside the geometric shape to be at another location outside the geometric shape corresponding to the pre-set location.

2. The method of claim 1, wherein the pre-set location on the interface corresponds to a command for the directional orientation of the robotic device to be forward, reverse, right, or left with respect to the current orientation of the robotic device.

3. The method of claim 1, wherein the geometric shape comprises a circle, wherein the circle is at an intersection of two perpendicular axes, and wherein the pre-set location on the interface includes a location that is located on one of the two perpendicular axes and intersects the circle or a location that is located on one of the two perpendicular axes and is outside the circle.

4. The method of claim 1, wherein the geometric shape comprises a circle, and wherein the pre-set location on the interface includes a location on or outside a circumference of the circle at one of 0 degrees, 90 degrees, 180 degrees, and 270 degrees, with respect to an x-y axis of the circle.

5. The method of claim 4, further comprising:
receiving at the device an amount of the predetermined threshold as a radial distance or a linear distance; and
adjusting the predetermined threshold to be the received amount.

6. The method of claim 1, further comprising:
providing on the interface a display of a region substantially adjacent or surrounding the pre-set location, wherein the region is indicative of the predetermined threshold.

7. The method of claim 1, further comprising:
receiving multiple inputs on the interface over time indicating commands for the directional orientation and the speed of the robotic device; and
as the multiple inputs on the interface approach the pre-set location, providing on the interface a display of a region substantially adjacent or surrounding the pre-set location, wherein the region is indicative of the predetermined threshold.

8. The method of claim 1, wherein the geometric shape overlays an x-y axis, and wherein the pre-set location on the interface includes a location on one of the axes of the x-y axis that intersects the geometric shape or a location on one of the axes of the x-y axis that is outside the geometric shape.

9. The method of claim 1, further comprising:
determining that the location of the input has changed to a second location on the interface; and
wherein determining that the location of the input on the interface is within the predetermined threshold to the pre-set location on the interface comprises determining that the second location on the interface is within the predetermined threshold to the pre-set location on the interface.

10. The method of claim 1, further comprising:
receiving multiple inputs on the interface over time indicating commands for the directional orientation and commands for the speed of the robotic device; and
providing multiple indicators on the interface that each include a representation of the command for the directional orientation of the robotic device, wherein one of the multiple indicators represents a previous location of the input on the interface and one of the multiple indicators represents a current location of the input on the interface.

11. The method of claim 10, wherein one of the multiple indicators represents a future location of a projected future input on the interface.

12. The method of claim 10, further comprising as the multiple inputs on the interface are received over time, fading out a display of the one of the multiple indicators that represents the previous location of the input on the interface.

13. The method of claim 1, further comprising:
modifying a location of the indicator on the interface to substantially match correspond to a location of a subsequent input on the interface; and
wherein determining that the location of the input on the interface is within the predetermined threshold to the pre-set location on the interface comprises determining that the subsequent input on the interface is at a location within the predetermined threshold to the pre-set location.

14. The method of claim 1, wherein the device includes a touchscreen configured to receive the input on the interface.

15. The method of claim 1, further comprising providing one or more of an audio or vibration indicator that is indicative of repositioning the marking outside the geometric shape.

16. The method of claim 1, further comprising providing on the interface text indicative of the command for the directional orientation of the robotic device.

17. The method of claim 1, further comprising:
responsive to determining that the location of the input on the interface is within the predetermined threshold to the pre-set location, generating a control signal indicating the command for the speed and a command for a predetermined directional orientation of the robotic device corresponding to the pre-set location; and
providing the control signal to the robotic device.

18. The method of claim 1, further comprising:
receiving from the robotic device information indicating a proposed change in the directional orientation of the robotic device; and providing on the interface a representation of the proposed change in the directional orientation of the robotic device.

19. The method of claim 18, further comprising receiving an input indicating one of an acceptance or denial of the proposed change in the directional orientation of the robotic device.

20. The method of claim 1, wherein the directional orientation of the robotic device indicates a directional orientation of a component of the robotic device, a directional movement of the robotic device, or a directional movement of a component of the robotic device.

21. A non-transitory computer readable medium having stored thereon instructions executable by a computing device to cause the computing device to perform functions comprising:
  receiving an input on an interface indicating a command for a directional orientation of a robotic device and a command for a speed of the robotic device, wherein particular pre-set locations on the interface at particular orientations with respect to a center of the interface correspond to commands for predetermined directional orientations of the robotic device with respect to a current orientation of the robotic device;
  providing an indicator on the interface representing a location of the input, wherein the interface includes a geometric shape, wherein the location of the input is within the geometric shape, and wherein the indicator includes a marking outside the geometric shape that is indicative of the command for the directional orientation of the robotic device;
  determining that the location of the input on the interface is within a predetermined threshold to one of the particular pre-set locations on the interface; and
  responsive to determining that the location of the input on the interface is within the predetermined threshold to the pre-set location, repositioning the marking outside the geometric shape to be at another location outside the geometric shape corresponding to the pre-set location.

22. The non-transitory computer readable medium of claim 21, further comprising instructions executable by the computing device to cause the computing device to perform functions comprising:
  receiving multiple inputs on the interface over time indicating commands for the directional orientation and commands for the speed of the robotic device;
  providing multiple indicators on the interface that each include a representation of the command for the directional orientation of the robotic device, wherein one of the multiple indicators represents a previous location of the input on the interface and one of the multiple indicators represents a current location of the input on the interface; and
  as the multiple inputs on the interface are received over time, fading out a display of the one of the multiple indicators that represents the previous location of the input on the interface.

23. A device comprising:
  a processor; and
  memory including instructions stored therein executable by the processor to perform functions comprising:
    receiving an input on an interface indicating a command for a directional orientation of a robotic device and a command for a speed of the robotic device, wherein particular pre-set locations on the interface at particular orientations with respect to a center of the interface correspond to commands for predetermined directional orientations of the robotic device with respect to a current orientation of the robotic device;
    providing an indicator on the interface representing a location of the input, wherein the interface includes a geometric shape, wherein the location of the input is within the geometric shape, and wherein the indicator includes a marking outside the geometric shape that is indicative of the command for the directional orientation of the robotic device;
    determining that the location of the input on the interface is within a predetermined threshold to one of the pre-set locations on the interface; and
    responsive to determining that the location of the input on the interface is within the predetermined threshold to the pre-set location, repositioning the marking outside the geometric shape to be at another location outside the geometric shape corresponding to the pre-set location.

24. The device of claim 23, wherein the geometric shape comprises a circle, and wherein the memory further includes instructions executable by the processor to perform functions comprising:
  receiving multiple inputs on the interface over time indicating commands for the directional orientation of the robotic device;
  providing multiple indicators on the interface that each include a representation of the command for the directional orientation of the robotic device, wherein one of the multiple indicators represents a previous location of the input on the interface and one of the multiple indicators represents a current location of the input on the interface; and
  wherein the multiple indicators are provided outside a portion of the circle and along a circumference of the circle.

* * * * *